(12) United States Patent
Pukari (10) Patent No.: US 10,872,484 B1
(45) Date of Patent: Dec. 22, 2020

(54) MOBILE DIGITAL LOCKING TECHNOLOGY

(71) Applicant: Axtuator Oy, Helsinki (FI)

(72) Inventor: Mika Pukari, Helsinki (FI)

(73) Assignee: AXTUATOR OY, Oulu (FI)

( * ) Notice: Subject to any disclaimer, the term of this patent is extended or adjusted under 35 U.S.C. 154(b) by 0 days.

(21) Appl. No.: 16/821,880

(22) Filed: Mar. 17, 2020

Related U.S. Application Data (60) Provisional application No. 62/931,580, filed on Nov. 6, 2019.

(51) Int. Cl.
| | |
|---|---|
| G07C 9/00 | (2020.01) |
| H04B 5/00 | (2006.01) |
| H04B 5/02 | (2006.01) |
| H04W 4/80 | (2018.01) |
| H04W 4/029 | (2018.01) |
| H04W 4/02 | (2018.01) |
| G06F 21/31 | (2013.01) |
| H04W 12/06 | (2009.01) |
| H04W 4/12 | (2009.01) |

(52) U.S. Cl.
CPC ......... *G07C 9/00904* (2013.01); *G06F 21/31* (2013.01); *G07C 9/00571* (2013.01); *H04B 5/0037* (2013.01); *H04B 5/02* (2013.01); *H04W 4/025* (2013.01); *H04W 4/029* (2018.02); *H04W 4/12* (2013.01); *H04W 4/80* (2018.02); *H04W 12/06* (2013.01)

(58) Field of Classification Search
CPC . G07C 9/00904; H04B 5/0037; H04W 4/025; H04W 12/06; H04W 4/80
USPC ........................................................ 340/5.61
See application file for complete search history.

(56) References Cited

U.S. PATENT DOCUMENTS

| | | | | |
|---|---|---|---|---|
| 2011/0256848 | A1* | 10/2011 | Bok, II ................. | H04M 1/725 455/411 |
| 2014/0292481 | A1* | 10/2014 | Dumas ............... | G07C 9/00174 340/5.61 |
| 2015/0107316 | A1* | 4/2015 | Kirkjan .............. | G07C 9/00182 70/275 |
| 2015/0235496 | A1* | 8/2015 | Vecchiotti ............ | H04W 12/04 340/5.61 |
| 2016/0019738 | A1* | 1/2016 | Kim ................... | G07C 9/00174 340/5.22 |
| 2017/0098335 | A1* | 4/2017 | Payack, Jr. ........ | G07C 9/00309 |

* cited by examiner

*Primary Examiner* — Vernal U Brown
(74) *Attorney, Agent, or Firm* — Patterson + Sheridan, LLP (57) ABSTRACT

Techniques for using a mobile station to open the doors of buildings and vehicles, instead of a dedicated physical key. The mobile station is configured to provide the operating power to a lock without a power cord. A mobile station app is then configured to communicate with the lock via a short-range wireless communication connection, and open and close the lock. This can provide an electronic software-based key and lock system that is cheaper and easier to use than the physical key.

27 Claims, 9 Drawing Sheets

MOBILE DIGITAL LOCKING TECHNOLOGY

CROSS REFERENCE TO RELATED APPLICATIONS

This application claims benefit of and priority to U.S. Provisional Application Ser. No. 62/931,580 filed on Nov. 6, 2019, which is hereby incorporated by reference in its entirety.

FIELD OF THE DISCLOSURE

The presently disclosed embodiments are generally related to digital locking technologies used in controlling the access of people into buildings and vehicles. More particularly the disclosure relates to methods and systems where a mobile phone is used to open doors of buildings and vehicles instead of a dedicated physical key.

BACKGROUND

Modern smartphones carry numerous software applications for performing different specialized tasks. For example, the prior art includes simplistic digital substitution attempts for the physical key for a physical lock. These substitution attempts are difficult for the consumer to use, lead to unauthorized and accidental door openings and/or require too much hardware at the lock making the lock power hungry and prohibitively expensive to install, maintain and update.

SUMMARY

One or more embodiments disclosed herein address and improve aforementioned deficiencies in above discussed prior art and provide an electronic software-based key and lock system that is cheaper and easier to use than the physical key.

One or more embodiments replace a physical key with a digital key while reducing the administrative burden both for the consumers in opening and closing the locks and for the property owners in maintaining the locks of the doors.

One or more embodiments disclosed herein allow the user to open a lock by simply opening the screen lock of his smartphone, and thus authenticating himself to the smartphone. Self-powered locks can be opened and powered with the smartphone. The locks are easy to install and maintain as they do not require a power cord or a battery.

Embodiments described herein include a digital locking system that includes a mobile station, a mobile station app, a cloud server, and a self-powered lock configured to open and lock a door and/or a padlock. The mobile station app is installed in the mobile station and is configured to be updated and maintained by software updates from the cloud server. The mobile station is configured to provide the operating power to the lock without a power cord. The mobile station app is configured to communicate with the lock via a short-range wireless communication connection, and the mobile station app is configured authenticate the user of the mobile station when the screen lock is unlocked and to remember the authentication of the user to the mobile station for a predefined time period that is longer than the time it takes for the mobile station screen lock to activate. Further, during the pre-defined time period the mobile station app is configured to submit a digital key of the user via the short-range wireless communication connection to the lock, thereby opening the lock.

While this disclosure describes opening and/or closing locked doors, embodiments described herein are equally applicable to locking and opening padlocks, bicycle locks, and other mechanic or electromagnetic-locks that control human entry and access.

In one embodiment, there is a mobile app installed in the mobile station that stores the digital keys of the user, and these digital keys can be used for a period of time after the mobile station screen is locked. When the user touches the lock with the mobile station, the mobile station will send an NFC signal containing the digital key to the lock, and the mobile station sends a power pulse to the lock. The lock uses the power pulse energy to open the lock if the digital key is a correct one configured to open the lock.

In another embodiment, the lock and/or the mobile station may request the user to approve the opening of the lock. The mobile app preferably answers these approvals with a "Yes" on behalf of the consumer. This allows the user to open doors so that the screen lock is only opened once, and the lock is only tapped or brought into proximity of the mobile station once. This way the user will spend less time opening the lock than with a traditional key. He simply pulls the smartphone from his pocket and taps the lock once to open it. The time spent in turning the key is removed. The cost and hassle of carrying a physical key is removed. The mobile station app will not open any doors which the user has not physically tapped with his phone or brought into direct proximity of his phone, so accidental door openings are almost completely eliminated.

In yet another embodiment, the power pulse is 2× times the energy the door needs to open or close, assuming these energies are the same. The lock can lock itself with the excess energy received from the power pulse automatically, if the user for example enters and then exits the door that the lock is supposed to control access to.

Embodiments described herein further include a digital locking software program product stored in a non-transient memory medium. The software program product is configured to operate in system including a mobile station, a mobile station app, a cloud server, and a self-powered lock configured to open and lock a door. The mobile station app is installed in the mobile station and is configured to be updated and maintained by software updates from the cloud server. The mobile station is configured to provide the operating power to the lock without a power cord. The mobile station app is configured to communicate with the lock via a short-range wireless communication connection, and the mobile station app is configured authenticate the user of the mobile station when the screen lock is unlocked and to remember the authentication of the user to the mobile station for a predefined time period that is longer than the time it takes for the mobile station screen lock to activate. Further, during the pre-defined time period the mobile station app is configured to submit a digital key of the user via the short-range wireless communication connection to the lock, thereby opening the lock.

Embodiments described herein further include a digital locking method executed in a system, including a mobile station, a mobile station app, a cloud server, and a self-powered lock configured to open and lock a door. The mobile station app installed in the mobile station updates from the cloud server. The mobile station provides the operating power to the lock without a power cord. The mobile station app communicates with the lock via a short-range wireless communication connection, and the mobile station app authenticates the user of the mobile station when the screen lock is unlocked and to remembers the authentication of the user to the mobile station for a predefined time period that is longer than the time it takes for the mobile station screen lock to activate. Further, during the predefined time period the mobile station app submits a digital key of the user via the short-range wireless communication connection to the lock, thereby opening the lock.

The advantages of the disclosed techniques are numerous. According to one or more embodiments, the lock is cheaper and more convenient for the consumers as the cost and hassle associated with physical keys is removed. There is no need to pay locksmiths to make physical keys and no need to carry a large number of keys in a keyring, which can be inconvenient especially if the user needs to carry a lot of keys or wears clothes with small pockets, e.g. a swimsuit.

One or more embodiments disclosed herein can include an Android or an iPhone App that the user can use to host all of his digital keys. This app is maintained from the cloud network, for example by keeping the App Google Play or App Store compliant. The digital keys are hosted on a cloud account that the user and the property owner or operator might share or both have access to. When the user taps a lock that is energized by the mobile phone that taps it, the App will provide a digital key configured to open the lock. The App may send other signals such as approvals that the lock software may require the user to provide on behalf of the user.

The techniques disclosed herein can be applied to a number of uses where a dedicated physical key is designed to open a lock, which is keeping a door locked. These uses include for example residential and/or business property door locks, vehicle door locks and the like.

DETAILED DESCRIPTION

Figure 1:
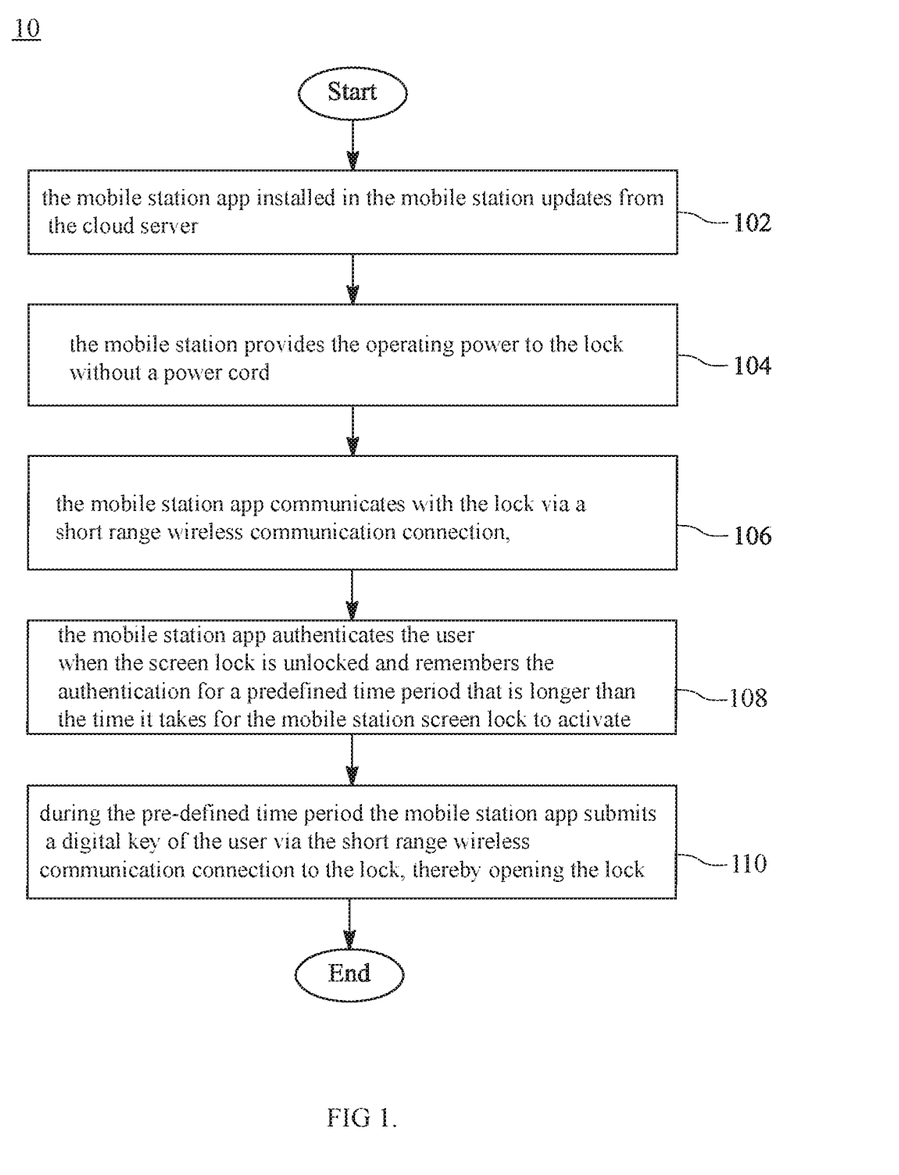
FIG. 1 illustrates an embodiment 10 of a flow chart showing a method of implementation of digital locking technology, according to one embodiment described herein.

FIG. 1 illustrates an embodiment 10 of a flow chart showing a method of implementation of the digital locking technology. The method could be implemented in a system identical or similar to embodiment 20, 50 and 80 in FIGS. 2, 5, and 8 respectively. The end-user of the method could use a user interface identical or similar to that disclosed with embodiment 30, 60, 90 shown in FIG. 3, FIG. 6 and FIG. 9, respectively.

The digital locking method operates in a system comprising a mobile station, a mobile station app, a cloud server, and a self-powered lock configured to open and lock a door. By a self-powered lock, we mean a lock that does not require a power cord or a battery. Instead a self-powered lock typically derives its energy from a photovoltaic cell, the key, mechanical motion of the user, and the like sources of energy. The classical example of a self-powered lock is the classical "old-school" mechanical lock and key, where the physical structure of the key is encoded and engraved so that it uniquely turns the lock to open it, and the operation power is derived from the wrist of the user as it turns the key.

However, in an embodiment the self-powered lock may be an electromagnetic lock. One example of a low power lock suitable to be implemented as the self-powered lock structure is that of the invention published in U.S. Pat. No. 10,253,528 which is incorporated by reference for its disclosure of a suitable lock.

In phase 102 the mobile station app installed in the mobile station updates from the cloud server. The mobile secretary cloud application may be available over Google Play™ store for downloading over to Android smartphones and over App Store™ for downloading to iOS™ smartphones, or from Microsoft for example as Windows 10X available on the Surface Neo tablet or the like. The mobile secretary cloud application may either be available for free, or as a paid application.

When the user is nearby the self-powered lock, with an updated mobile phone and the mobile app with a digital key to open the lock, he may embark on using his key to open the lock. In phase 104 the mobile station typically provides the operating power to the lock without a power cord. This is typically achieved via NFC, or wireless charging. Examples of wireless charging include inductive charging technologies, such as Qi from the Wireless Power Consortium. Of course, there could also be a photovoltaic cell attached to the lock to self-power it in some embodiments.

Typically, the mobile station app holds the digital key capable of opening the powered lock. After the lock has been sufficiently powered to lock and/or unlock itself, the mobile station app communicates with the lock via a short-range wireless communication connection in phase 106 to submit the key and open the lock. Preferably, the short-range wireless communication connection is an NFC connection. The user will take the mobile station out of his pocket, and tap the lock, or bring the mobile station within NFC range. Similarly, directional laser or infrared communication, found in remote controls could be used. Bluetooth, Wi-Fi or cellular data could also be used to communicate with the lock, but this has the disadvantage that the signal could be eavesdropped.

In phase 108 the mobile station app authenticates the user of the mobile station when the screen lock is unlocked. Authentication can take place by requesting a password or a PIN-code, or with biometric identification, such as a fingerprint or Face ID, i.e. a Face Scan of the user. The mobile station app remembers the authentication of the user to the mobile station for a predefined time period. This period is longer than the time it takes for the mobile station screen lock to activate. This has the significant advantage that the user can open locks and walk through doors by using the mobile phone as the physical key, without having to unlock the screen lock or the re-authenticate himself every time. This is a significant advantage, as it makes the app-based digital key finally more convenient than the classical physical key.

During the pre-defined time period the mobile station app submits a digital key of the user via the short-range wireless communication connection to the lock, thereby opening the lock in phase 110. The mobile station app typically auto-generates answers to questions/approvals that might be required by the lock or mobile station software, resulting in a seamless opening of the lock, with just one tap or user gesture.

The order of the phases 102, 104, 106, 108 and 110 may be permuted in accordance with one or more embodiments of the invention. Any features of embodiment 10 may be readily combined or permuted with any of the other embodiments 20, 30, 40, 50, 60, 70, 80 and/or 90 in accordance with one or more embodiments of the invention.

Figure 2:
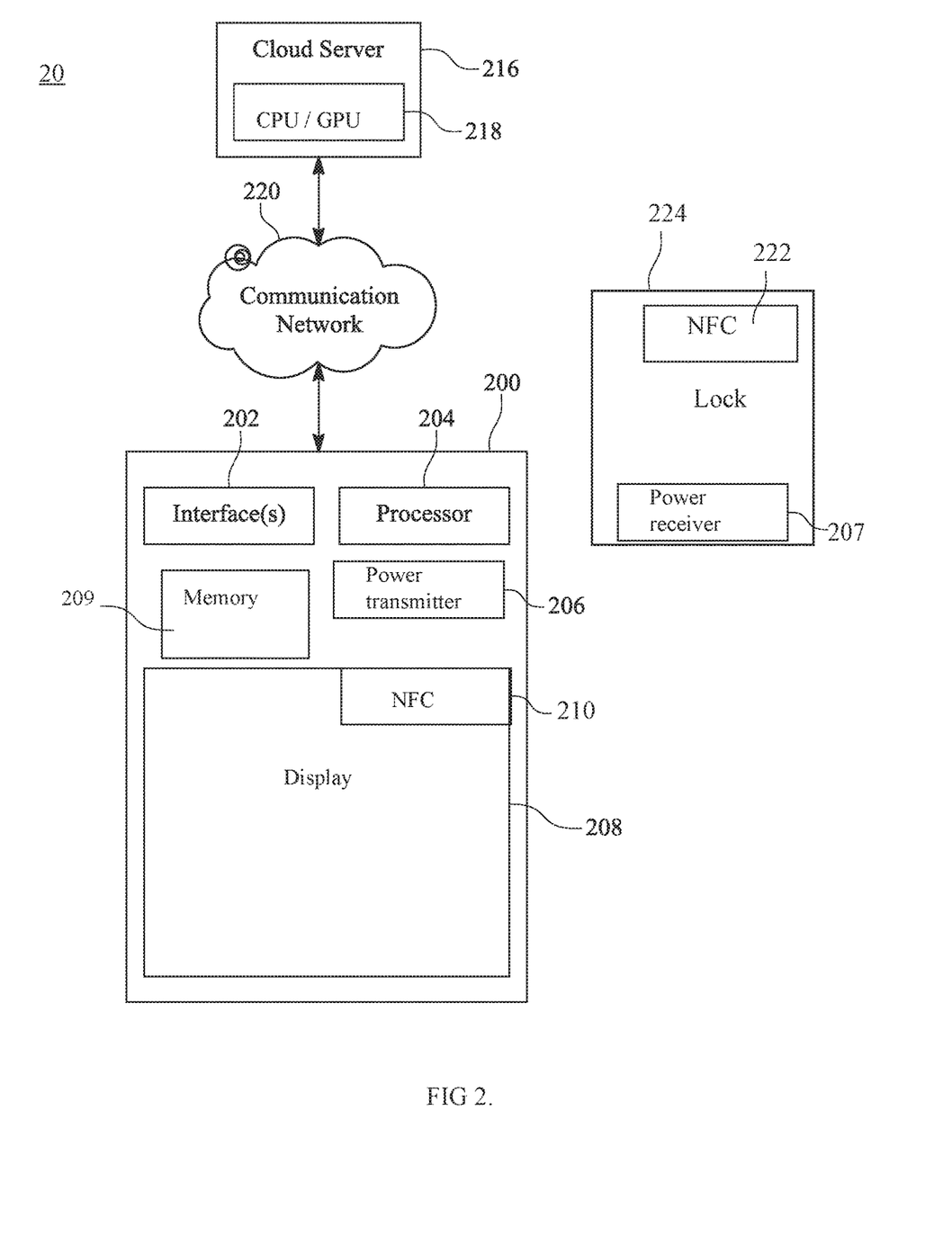
FIG. 2 illustrates an embodiment 20 of a block diagram of a digital locking system 200, according to one embodiment described herein.

FIG. 2 illustrates an embodiment 20 of a block diagram of a digital locking system. The digital locking system comprises a mobile station 200, a mobile station app stored in the data storage and/or memory 209 of the mobile station 200 and running with the processor 204 of the mobile station 200. The system also comprises a cloud server 216, and a self-powered lock 224 configured to open and lock a door.

The mobile station 200 comprises interface(s) 202, processor 204, a power transmitter 206, a display 209 and memory 209.

Interface(s) 202 are used to interact with or program the mobile station 200. The interface(s) 202 may either be a Command Line Interface (CLI) or a Graphical User Interface (GUI).

The processor 204 may refer to any one or more microprocessors, finite state machines, computers, microcontrollers, digital signal processors, logic, a logic device, an electronic circuit, an application specific integrated circuit (ASIC), a field-programmable gate array (FPGA), a chip, etc., or any combination thereof, capable of executing computer programs or a series of commands, instructions, or state transitions. The processor 204 may also be implemented as a processor set comprising, for example, a general-purpose microprocessor and a math or graphics co-processor. The processor 204 may be selected, for example, from the Intel® processors such as the Itanium® microprocessor or the Pentium® processors, Advanced Micro Devices (AMD®) processors such as the Athlon® processor, UltraSPARC® processors, microSPARC™ processors, HP® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, etc. The control unit disclosed herein is not limited to employing the processor 204. The control unit may also employ a controller or a microcontroller and other electronics components.

The memory 208 includes a computer readable medium. A computer readable medium may include volatile and/or non-volatile storage components, such as optical, magnetic, organic or other memory or disc storage, which may be integrated in whole or in part with a processor, such as processor 204. Alternatively, all or part of the entire computer readable medium may be remote from processor 204 and coupled to processor 204 by connection mechanism and/or network cable. In addition to memory 208, there may be additional memories that may be coupled with the processor 204 or a GPU (Graphics Processing Unit).

In an embodiment, the system 200 is integrated with a cloud server 216, via a communication network 220. The cloud server may comprise a CPU or a GPU 218. The communication network 220 used for the communication can be the wireless or wireline Internet or the telephony network, which is typically a cellular network such as UMTS- (Universal Mobile Telecommunication System), GSM- (Global System for Mobile Telecommunications), GPRS- (General Packet Radio Service), CDMA- (Code Division Multiple Access), 3G-, 4G-, 5G-Wi-Fi and/or WCDMA (Wideband Code Division Multiple Access)-network.

In an example, the cloud server 216 may comprise a plurality of servers (not shown). In an example implementation, the cloud server 216 may be any type of a database server, a file server, a web server, an application server, etc., configured to store data related to the mobile station locking application and/or other applications. In another example implementation, the cloud server 216 may comprise a plurality of databases for storing the data files. The databases may be, for example, a structured query language (SQL) database, a NoSQL database such as the Microsoft® SQL Server, the Oracle® servers, the MySQL® database, etc. The cloud server 216 may be deployed in a cloud environment managed by a cloud storage service provider, and the databases may be configured as cloud-based databases implemented in the cloud environment.

The cloud server 216 which may include an input-output device usually comprises a monitor (display), a keyboard, a mouse and/or touch screen. However, typically there is more than one computer server in use at one time, so some computers may only incorporate the computer itself, and no screen and no keyboard. These types of computers are typically stored in server farms, which are used to realize the cloud network used by the cloud server 216 according to one or more embodiments. The cloud server 216 can be purchased as a separate solution from known vendors such as Microsoft and Amazon and HP (Hewlett-Packard). The cloud server 216 typically runs Unix, Microsoft, iOS, Linux or any other known operating system, and comprises typically a microprocessor, memory, and data storage means, such as SSD flash or Hard drives. To improve the responsiveness of the cloud architecture, the data is preferentially stored, either wholly or partly, on SSD i.e. Flash storage. This component is either selected/configured from an existing cloud provider such as Microsoft or Amazon, or the existing cloud network operator such as Microsoft or Amazon is configured to store all data to a Flash based cloud storage operator, such as Pure Storage, EMC, Nimble storage or the like. Using Flash as the backbone storage for the cloud server 216 is preferred despite its high cost due to the reduced latency that is required and/or preferred for retrieving user data, user preferences, and data related to mobile/software applications etc. Flash over 5G is especially preferred for one or more embodiments, as users of the locking application do not want to wait for long behind the door.

The mobile station 200 may be configured as a mobile terminal computer, typically a smartphone and/or a tablet that is used to manage the digital keys of the user by operating software applications installed on the smartphone, etc. The system 200 is typically a mobile smartphone, such as iOS, Android or a Windows Phone smartphone.

However, it is also possible that the system 200 is a mobile station, mobile phone or a computer, such as a PC-computer, Apple Macintosh computer, PDA-device (Personal Digital Assistant). The system 200 could further be a device having an operating system such as any of the following: Microsoft Windows, Windows NT, Windows CE, Windows Pocket PC, Windows Mobile, GEOS, Palm OS, Meego, Mac OS, iOS, Linux, BlackBerry OS, Google Android and/or Symbian or any other computer or smart phone operating system.

The mobile station app is installed in the mobile station and is configured to be updated and maintained by software updates from the cloud server 216. The cloud server 216 may also provide the software updates via Google Play, App Store or any other app distribution mechanism that is preferable.

The lock 224 is typically self-powered, deriving its power from NFC (Near Field Communication) 222 or wireless charging with the power receiver 207. This type of lock is small, durable, reliable and cheap to install and maintain. The mobile station 200 is configured to provide the operating power to the lock via NFC or via wireless charging, for example via Qi.

The mobile station app is configured authenticate the user of the mobile station 200 when the screen lock is unlocked and to remember the authentication of the user to the mobile station for a predefined time period that is longer than the time it takes for the mobile station screen lock to activate. So, if the mobile station is for example iPhone X, the user will be authenticated by a 6-number passcode, or a facial 3D scan. The mobile station app will capture and read a successful authentication and activate a digital key(s) belonging to the user. These digital keys will be held active for the longer period, so that the mobile station app can be used to open locks even after the screen gets locked, without a need for the user to re-authenticate.

During the pre-defined longer time period the mobile station app submits a digital key of the user via the short-range wireless communication connection to the lock 224, thereby opening the lock 224. The mobile station app is configured to communicate with the lock 224 via a short-range wireless communication connection, which is preferably NFC. NFC has the advantage that the user needs to bring the mobile station 200 to within a few centimeters from the lock. This close proximity makes it very difficult to eavesdrop on the signal and capture the digital keys for illegal uses.

Various technological standards and the operating system of the mobile station 200 may generate approval questions to the user, requesting the user to approve the opening of the lock 224. Preferably the mobile station app auto-answers these prompts in order to unlock the door with just a one-time NFC interaction between the mobile station 200 and the lock 224. This results in a seamless lock opening experience that is more convenient than the traditional mechanical key.

Any features of embodiment 20 may be readily combined or permuted with any of the other embodiments 10, 30, 40, 50, 60, 70, 80 and/or 90 in accordance with one or more embodiments of the invention.

Figure 3:
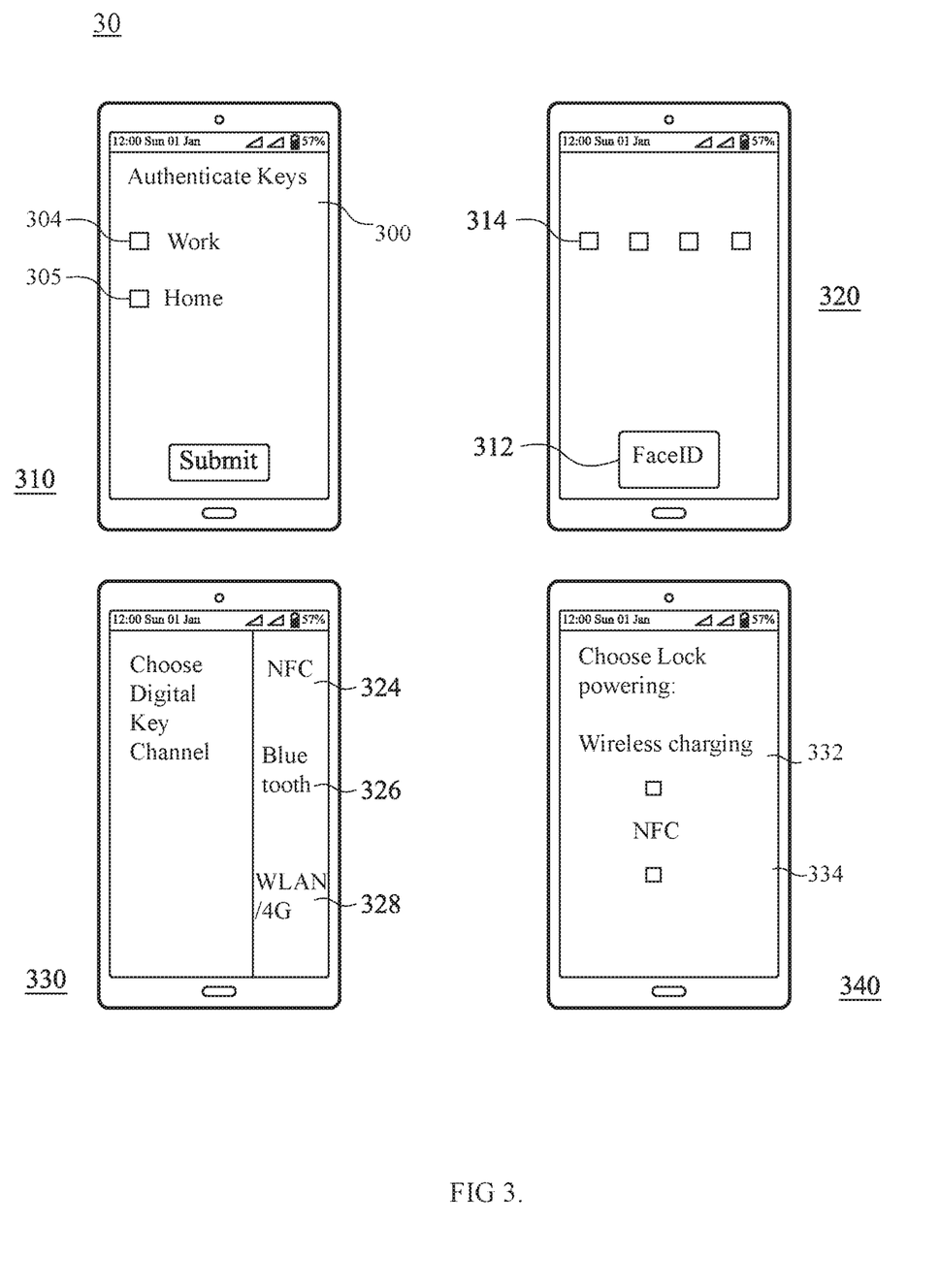
FIG. 3 illustrates an embodiment 30 of a user interface showing a mobile digital locking application operating a lock, according to one embodiment described herein.

FIG. 3 illustrates an embodiment 30 of a user interface showing a mobile digital locking application, i.e. an app, in accordance with one or more embodiments of the invention. The mobile station app is installed in the mobile station and is configured to be updated and maintained by software updates from the cloud server. The updates may be facilitated by App stores associated with the operating system, which include the Apple App Store for iOS and Google Play for Android. In embodiment 30 the user is configuring the mobile station app 300 into use.

In screenshot 310 the user is choosing which digital keys to authenticate. Many people use more than one keys, for example one key for work, and one for home. If both keys are digital, the user can take both keys into use within the mobile station app 300. The user ticks the boxes 304 and 305 to authenticate both Work and Home keys, and presses Submit at the bottom of the screen.

In Screenshot 320 the mobile station app 300 is configured authenticate the user of the mobile station 200 when the screen lock is unlocked and to remember the authentication of the user to the mobile station 200 for a predefined time period that is longer than the time it takes for the mobile station screen lock to activate. The user may for example enter a private 4-digit PIN code into fields 314. The user may also perform a 3D scan of his face 312, or provide a fingerprint if the mobile station is capable of biometrically authenticating him.

In screenshot 330 the mobile station app is configured to select a communication channel for communicating with the lock. Preferably many users choose to communicate with the lock via a short-range wireless communication connection such as the NFC 324 for security reasons. However, it may also be possible to activate different communication channels, such as Bluetooth 326 and WLAN/cellular data 328. Sometimes the user may want to open the lock from far away, and is willing to ignore the risk of eavesdropping. Sometimes one communication channel will not work, and a second communication channel needs to be opened for communication. For example, the NFC receiver of the lock might be broken sometimes. It is also in accordance with one or more embodiments of the invention for the user to configure the communication channels 324, 326, 328 into an order of priority and designate fallback options in the order of priority. For example, NFC 324 is tried as the first option, but if that does not work, then communication is retried via Bluetooth, but if even that does not work, the mobile station app uses WLAN/cellular data as the last resort to try and communicate with the lock.

In screenshot 340 the lock powering options are configured. A typical mobile phone is NFC compliant, but may also have some wireless charging capability, such as Qi compliant wireless charging capability. Therefore, the user may select either wireless charging by ticking the box 332, or NFC by ticking the box 334. The mobile station is then configured to provide the operating power to the lock without the lock needing its own power source. Similarly, to the communication channel discussed with screen shot 330, multiple choices with the lock powering can also be selected. For example, in some embodiments NFC charging 334 may be selected as the first choice, and lock powering is attempted via NFC charging first 334. Wireless charging 332, such as Qi, which does not include fast and secure communication, may be selected as the second choice for powering, which is automatically used or attempted to be used if NFC powering fails.

During the pre-defined time period the mobile station app is configured to submit a digital key of the user via the short-range wireless communication connection to the lock using the communication channels and lock powering options as specified in screen shots 330 and 340, thereby opening the lock.

Any features of embodiment 30 may be readily combined or permuted with any of the other embodiments 10, 30, 40,

50, 60, 70, 80 and/or 90 in accordance with one or more embodiments of the invention.

Figure 4:
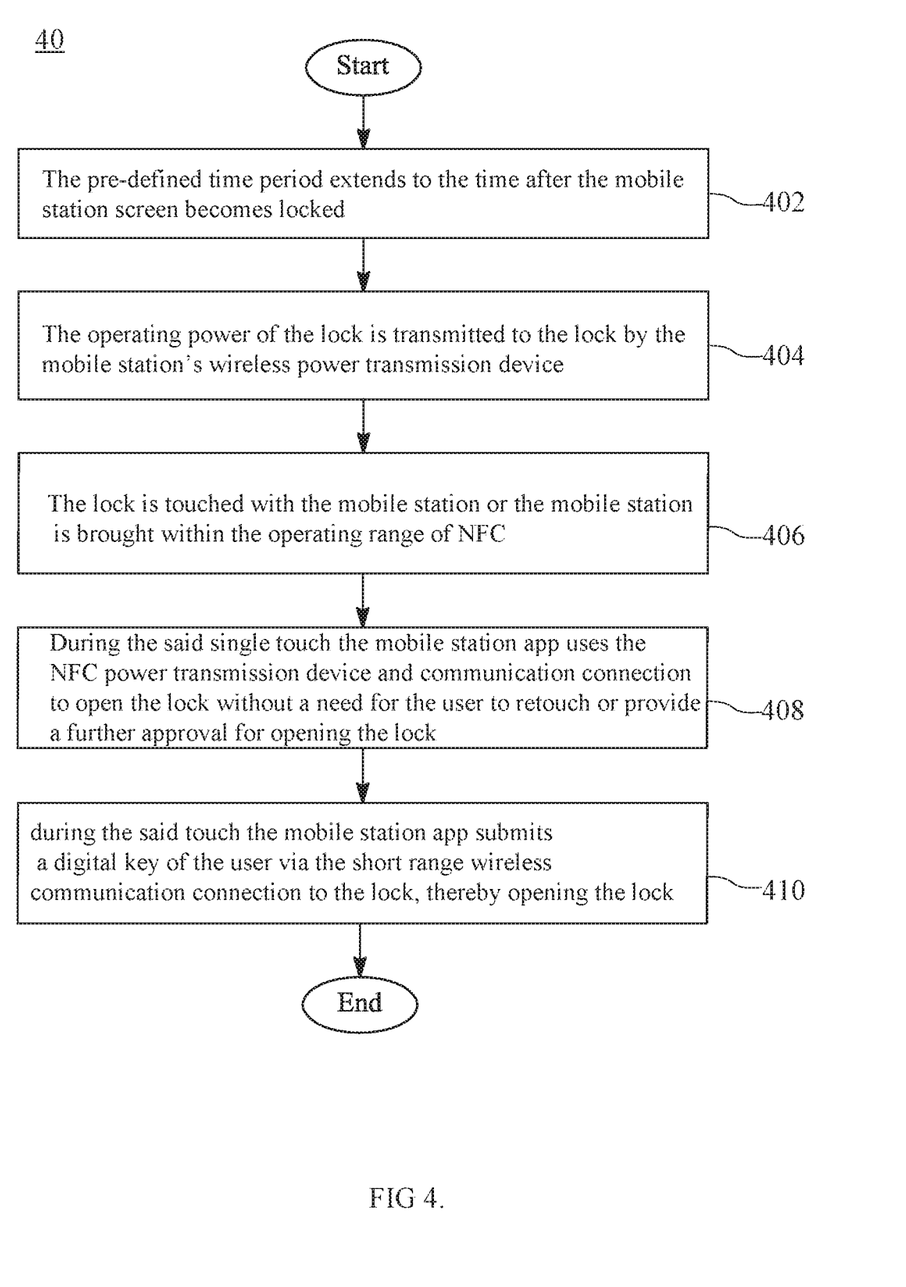
FIG. 4 illustrates an embodiment 40 of a flow chart showing a method of operation of digital locking technology when the user and the lock are in proximity of one another, according to one embodiment described herein.

FIG. 4 illustrates an embodiment 40 of a flow chart showing a method of implementation of the digital locking technology. The method could be implemented in a system identical or similar to embodiment 20, 50 and 80 in FIGS. 2, 5, and 8 respectively. The end-user of the method could use a user interface identical or similar to that disclosed with embodiment 30, 60, 90 shown in FIG. 3, FIG. 6 and FIG. 9, respectively.

FIG. 4. illustrates an embodiment 40 of a flow chart showing a method of operation of the digital locking technology when the user and the lock are in immediate proximity of one another, i.e. the user is in front of the locked door trying to open the lock with his mobile phone.

In phase 402 the pre-defined time period extends to the time after the mobile station screen becomes locked, and the mobile station app communicate the digital key to the lock without the user having to unlock the mobile station screen by reauthentication. So, the user is standing in front of the locked door, the mobile station screen is locked. However, the mobile station locking app is still active and the digital key is in the mobile station memory 209, ready to be submitted to the lock. The mobile station app may for example be configured to activate the power transmission device to scan for nearby locks during said predefined period. This may happen for example when the motion of the mobile station is determined to stop based upon the gyroscope or accelerometer readings of the mobile station, which is indicative of the user having lifted the mobile station 200 from his pocket. Similarly the gyroscope readings or accelerometer readings may be configured to detect when the user touches the lock with his mobile phone, for example with a little tap.

Also, as an alternative the mobile station app 300 may be configured to periodically activate the power transmission device, or any communication channel 324, 326, 328 to scan for nearby locks during said predefined period.

In phase 404 the operating power of the lock is transmitted to the lock by the mobile station's wireless power transmission device that may include any of NFC or Qi, and the lock is powered without any need for its own power source.

In phase 406, a short-range wireless communication is established between the lock and the mobile station. The lock is touched with the mobile station or the mobile station is brought within the operating range of NFC, which is below 5 centimeters, of the lock in order to open or close the lock. In alternative embodiments, the short-range wireless communication connection can be a Bluetooth, Wi-Fi, infrared, microwave and/or laser connection.

In phase 408, during the said single touch or close encounter with the lock the mobile station app uses the NFC power transmission device and communication connection to open the lock without a need for the user to retouch or provide a further approval for opening the lock. Sometimes the lock or the operating system of the mobile station 200 may require further approvals from the user. However, the mobile station app 300 is preferably configured to automatically generate the responses to those approval requests. This will generate a seamless digital lock opening experience where one touch or close encounter with the mobile station 200 will open the lock via NFC.

So, in phase 410 the digital key of the user is submitted to the lock via the short-range communication connection, thereby opening the lock.

In one optional but preferable implementation, after a pre-defined time the lock is automatically locked using the electric power received from the mobile station during the opening procedure and/or touch in phase 404. This would mean that the energy transmitted in phase 404 would need to add up to the total of both the opening and the closure energy required for the lock.

Any features of embodiment 40 may be readily combined or permuted with any of the other embodiments 10, 20, 30, 50, 60, 70, 80 and/or 90 in accordance with one or more embodiments of the invention.

Figure 5:
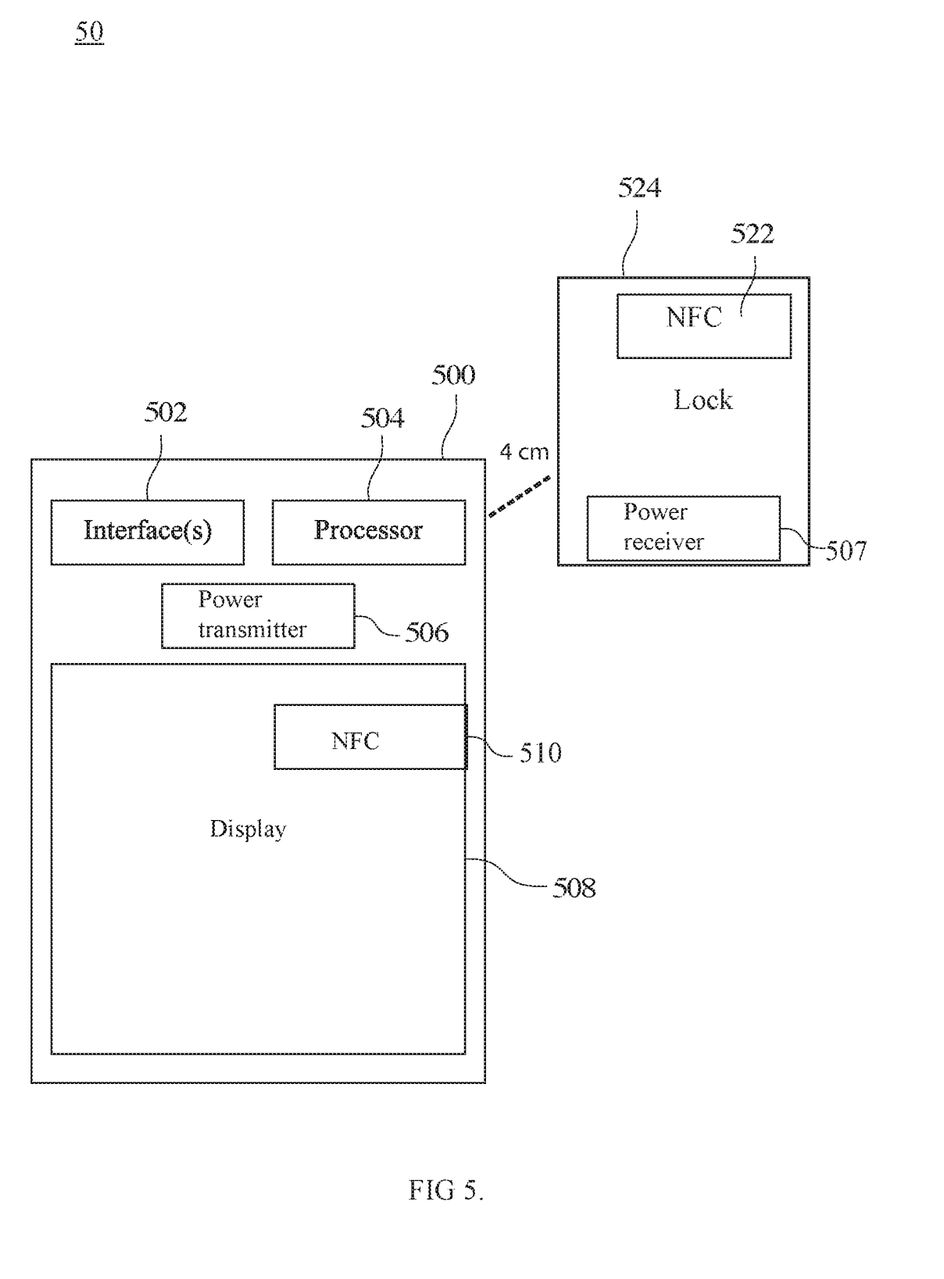
FIG. 5 illustrates an embodiment 50 of a block diagram of a digital locking system 500 as a close-up figure, according to one embodiment described herein.

FIG. 5 illustrates an embodiment 50 of a block diagram of a digital locking system 500 as a close-up figure. The lock and the mobile station of the user are less than 4 centimeters away. This distance is sufficient for NFC to operate. Wireless inductive charging may require touch, or a distance similar to 4 cm.

The operating power of the lock 524 is transmitted to the lock by the mobile station's wireless power transmission device 506 that may include any of NFC or Qi. When the lock is powered, the short-range wireless communication is established between the lock 524 and the mobile station 500.

The short-range wireless communication connection 510 may be a Bluetooth, Wi-Fi, infrared, microwave and/or laser connection, but preferably is an NFC as shown.

The pre-defined time period is configured to extend to the time after the mobile station screen 508 becomes locked. By the screen becoming locked, we mean that the keyboard within the touch screen is disabled until user authentication, as is the case in e.g. iPhone today. The mobile station app is configured to communicate the digital key to the lock 524 without the user having to unlock the mobile station screen 508 and reauthenticate. This makes it possible to use the mobile station 500 securely as a key multiple times without having to enter passcodes, fingerprints and/or FaceIDs for authentication.

The lock 524 is touched with the mobile station 500 or the mobile station 500 is brought within the operating range of NFC, which is below 5 centimeters, of the lock 524 in order to open or close the lock. During the said single touch or close encounter, the mobile station app 300 uses the NFC power transmission device and communication connection to open the lock without a need for the user to retouch or provide a further approval for opening the lock.

Preferably, the mobile station app 300 is configured to activate power transmission device 506 to scan for nearby locks 524 during said predefined period when the motion of the mobile station 500 is determined to stop based upon the gyroscope readings of the mobile station. This usually signals that the user has lifted the mobile station out of his pocket, and placed it in proximity of the lock 524.

Also, preferably, the mobile station app 300 is configured to periodically activate the power transmission device 506 to scan for nearby locks 524 during said predefined period. After a pre-defined time, the lock 524 is automatically locked, using the electric power received from the mobile station 500 during the opening procedure and/or touch. Assuming the locking and unlocking to have the same energy consumption X Joules, the said power pulse from the power transmission device would preferably be a bit more than 2× Joules, thus sufficient to open and close the lock.

Any features of embodiment 50 may be readily combined or permuted with any of the other embodiments 10, 20, 30, 40, 60, 70, 80 and/or 90 in accordance with one or more embodiments of the invention.

Figure 6:
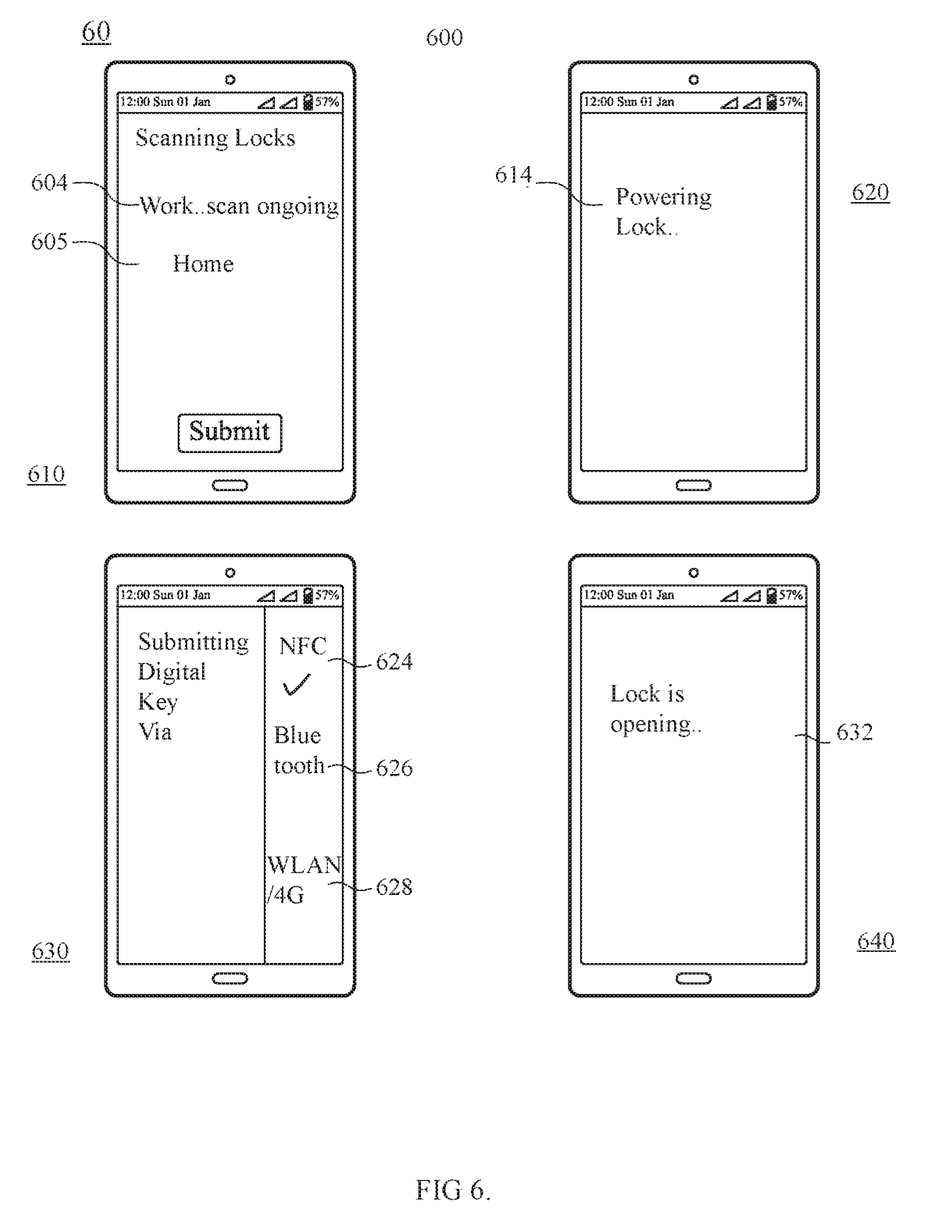
FIG. 6 illustrates an embodiment 60 of a user interface showing a mobile digital locking application operating a lock when the user opening or closing the lock, according to one embodiment described herein.

FIG. 6 illustrates an embodiment 60 of a user interface showing a mobile digital locking application 600 operating a lock 524 when the user opening or closing the lock is in direct proximity of the lock, in accordance with one or more embodiments of the invention.

The mobile station app 600 is configured to periodically activate the power transmission device 506 to scan for nearby locks, as shown in screenshot 610. The user is at work, and the mobile station app 600 is scanning for locks, preferably within the time period of the mobile station app 600 remembering the authentication. The mobile station app 600 may also be configured to activate the power transmission device 506 to scan for nearby locks 524 during said predefined period, when the motion of the mobile station 500 is determined to stop based upon the gyroscope readings of the mobile station 500. Alternatively an accelerometer, using for example piezoelectric measurement, could be used to detect the stopping of the motion of the mobile station 500.

In screenshot 620 the operating power of the lock is transmitted to the lock by the mobile station's wireless power transmission device 506 that may include any of NFC or Qi, and when the lock is powered, the short-range wireless communication is established between the lock and the mobile station 500.

The short-range wireless communication connection may be any of the following: Bluetooth, NFC, Wi-Fi, infrared, microwave and/or laser connection. The communication channel 624, 626, 628 via which the user wishes to send the Digital key is ticked in screenshot 630. Preferably this communication channel is NFC 624, because a longer-range communication channel may result in accidental openings of locks distant from the user.

If the lock is touched with the mobile station 500 or the mobile station 500 is brought within the operating range of NFC, which is below 5 centimeters, the user's digital key is submitted to the lock 524 in order to open the lock as shown in screenshot 640. During the said single touch the mobile station app 600 uses e.g. an NFC power transmission device or wireless charging that can be inductive, and the communication connection selected in screenshot 630 to open the lock without a need for the user to retouch or provide a further approval for opening the lock 632. After a predefined time, the lock is automatically locked using the electric power received from the mobile station during the opening procedure and/or touch. In this event the screen 632 would read: "Lock is closing.", in contrast to the present text of: "Lock is opening . . . ".

Any features of embodiment 60 may be readily combined or permuted with any of the other embodiments 10, 20, 30, 40, 50, 70, 80 and/or 90 in accordance with one or more embodiments of the invention.

Figure 7:
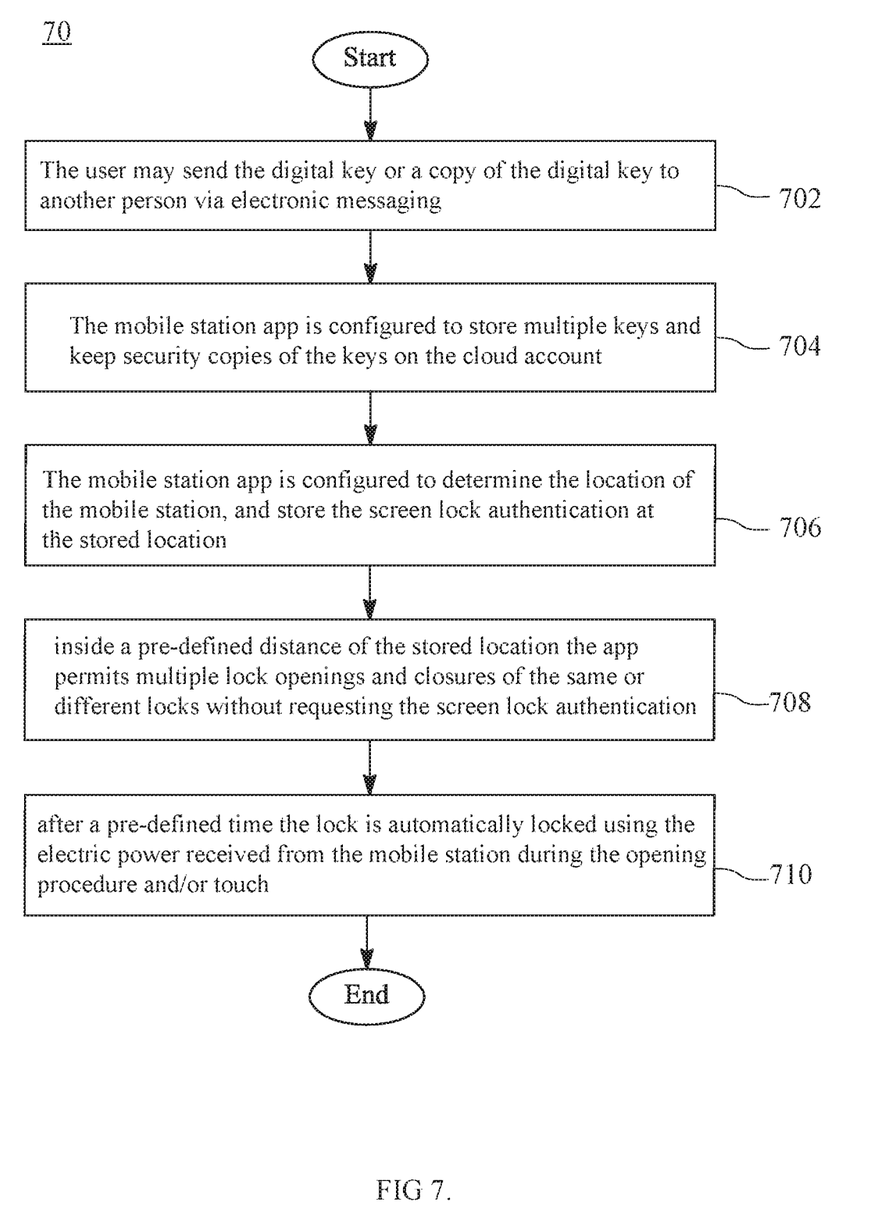
FIG. 7 illustrates an embodiment 70 of a flow chart showing a method of operation of the digital locking technology when the user moves about, according to one embodiment described herein.

FIG. 7 illustrates an embodiment 70 of a flow chart showing a method of implementation of the digital locking technology on a macro scale. The method could be implemented in a system identical or similar to embodiment 20, 50 and 80 in FIGS. 2, 5, and 8 respectively. The end-user of the method could use a user interface identical or similar to that disclosed with embodiment 30, 60, 90 shown in FIG. 3, FIG. 6 and FIG. 9, respectively.

FIG. 7. illustrates an embodiment 70 of a flow chart showing a method of operation of the digital locking technology when the user moves about. In phase 702 the user may send the digital key or a copy of the digital key to another person via electronic messaging, thereby authorizing the opening of the lock to this person. This is useful for example in situations when the user is far from his home, and he wants to let a relative or a friend into the home. Preferably the electronic message is sent via the cellular communication network or via a short-range wireless communication connection in phase 702.

In phase 704 the mobile station app is configured to store multiple keys and keep security copies of the keys on the cloud account of the user, or on at least one cloud server, or generate new keys. The digital keys may be held for example on the iCloud account of the user, if the user is using an iPhone, or in the Google cloud, if the user is using an Android mobile station. Alternatively, the keys may be held in a dedicated cloud account associated with the mobile station app 600 in accordance with one or more embodiments of the invention.

In phase 706 the mobile station app 900 is configured to determine the location of the mobile station, and store the screen lock authentication at the stored location, and inside a pre-defined distance of the stored location. Location is typically determined using GPS (Global Positioning System, Galilei, cellular base station tri-angulation methods, and/or base station identities, such as Wi-Fi or iBeacon base station ID's.

In phase 708 the location determination is used to permit multiple lock openings and closures from the same or multiple different locks without requesting the screen lock authentication at that location. This is useful in situations where the user is at home, or at his work office, where he can use his digital key ubiquitously without re-authenticating himself to the mobile station every time he needs to open a door.

the mobile station app is configured to activate power transmission device to scan for nearby locks during said predefined period when the motion of the mobile station is determined to stop based upon the gyroscope readings of the mobile station. The gyroscope readings typically indicate that the user is trying to touch a lock with his mobile phone and gain entry by unlocking that lock. As the user pulls the mobile station from his pocket and taps the lock with this mobile phone, these types of gyroscope readings are produced.

The mobile station app is configured to periodically activate the power transmission device to scan for nearby locks during said predefined period. If the user is using a longer-range communication channel, such as Bluetooth, this could be programmed so that the lock would open when the user comes within the lock's range, e.g. 2-3 meters. This would indeed allow ubiquitous movement through locked doors openable by the digital keys. However, the risk of an unintended opening of a lock grows with range.

In phase 710, after a pre-defined time from the opening, the lock is automatically locked using the electric power received from the mobile station 800 during the opening procedure and/or touch. If this period is set short, e.g. 2-4 seconds, it may be possible that the doors would be opened via Bluetooth 2-3 meters before the user is at the handle of the door. This way the lock would close immediately after the user has entered, or if there is an unintended opening of a lock, any possible intruder will have a very short time to gain entry via the accidentally opened lock.

Any features of embodiment 70 may be readily combined or permuted with any of the other embodiments 10, 20, 30, 40, 50, 60, 80 and/or 90 in accordance with one or more embodiments of the invention.

Figure 8:
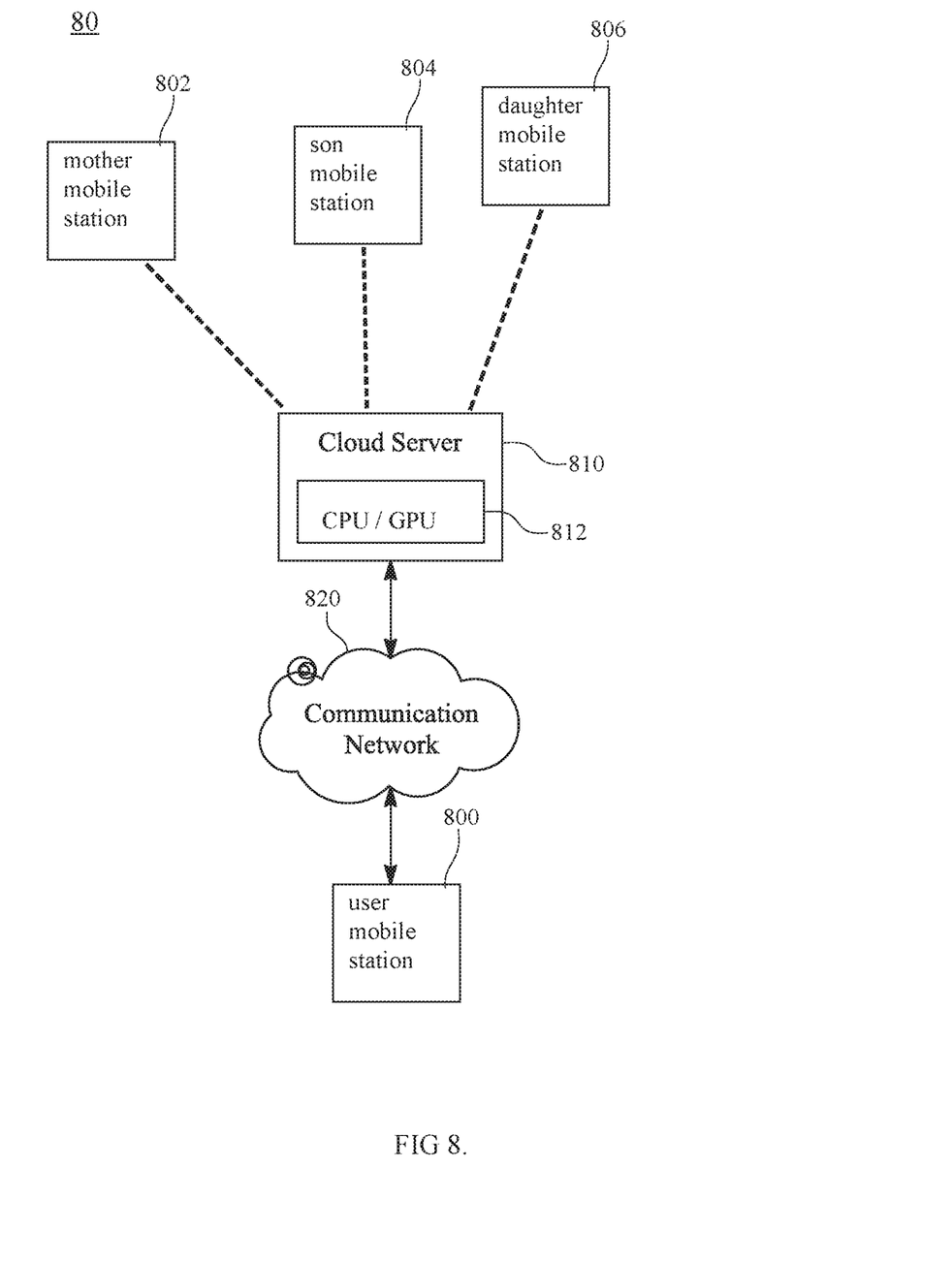
FIG. 8 illustrates an embodiment 80 of a block diagram of a digital locking system 800 on a large-scale network diagram, according to one embodiment described herein.

FIG. 8 illustrates an embodiment 80 of a block diagram of a digital locking system 800 as a network topology diagram.

The mobile station app 900 is typically configured to store multiple keys and keep security copies of the keys on the cloud account of the user on at least one cloud server 810, and/or generate new keys.

The user may send the digital key or a copy of the digital key to another person via electronic messaging from his mobile station 800, thereby authorizing the opening of a particular lock he has access to, to this person. Typically, this person is a friend or a relative, such as mother 802, son 804 or daughter 806. The electronic message containing the digital key is typically sent via the cellular communication network 820 and/or via a short-range wireless communication connection 820.

The mobile station app 900 is configured to determine the location of the mobile station, and store the screen lock authentication at the stored location. Preferably inside a pre-defined distance of the stored location, multiple lock openings and closures from the same or multiple different locks are permitted without requesting the screen lock authentication. A digital key for a home sent to the mobile station of the son 804, may in some embodiments activate the mobile locking application installed in the mobile station 804, so that the digital key is used ubiquitously by the son, and many doors are opened multiple times, without the son having to authenticate to mobile station 804 every time he opens a door.

In some embodiments the mobile station app installed in any of the mobile stations 800 802, 804, 806 is configured to activate a power transmission device to scan for nearby locks. This may preferably happen during said predefined period, for example when the motion of the mobile station 800 802, 804, 806 is determined to stop based upon the gyroscope readings of that mobile station 800 802, 804, 806, indicating that the mobile station has been pulled from the pocket, and is being used as a key to open a lock. Alternatively, the mobile station app 900 may be configured to periodically activate the power transmission device to scan for nearby locks during said predefined period of remembering user authentication.

In some embodiments, after a pre-defined time, the lock is automatically locked using the electric power received from the mobile station 800, 802, 804, 806 during the opening procedure and/or opening touch. In some embodiments the historical openings and closures of the locks are recorded either on the mobile stations 800, 802, 804, 806, on the cloud server 810, or both. This way, the digital locking application 900 could double as a work time monitor, recording for example the hours spent by an employee at his work. Or the recorded and logged time could be used as basis for hotel or lease or short term stay, such as Airbnb, billing, if the time spent in a room is used as a basis for billing the digital key holder.

Any features of embodiment 80 may be readily combined or permuted with any of the other embodiments 10, 20, 30, 40, 50, 60, 70 and/or 90 in accordance with one or more embodiments of the invention.

Figure 9:
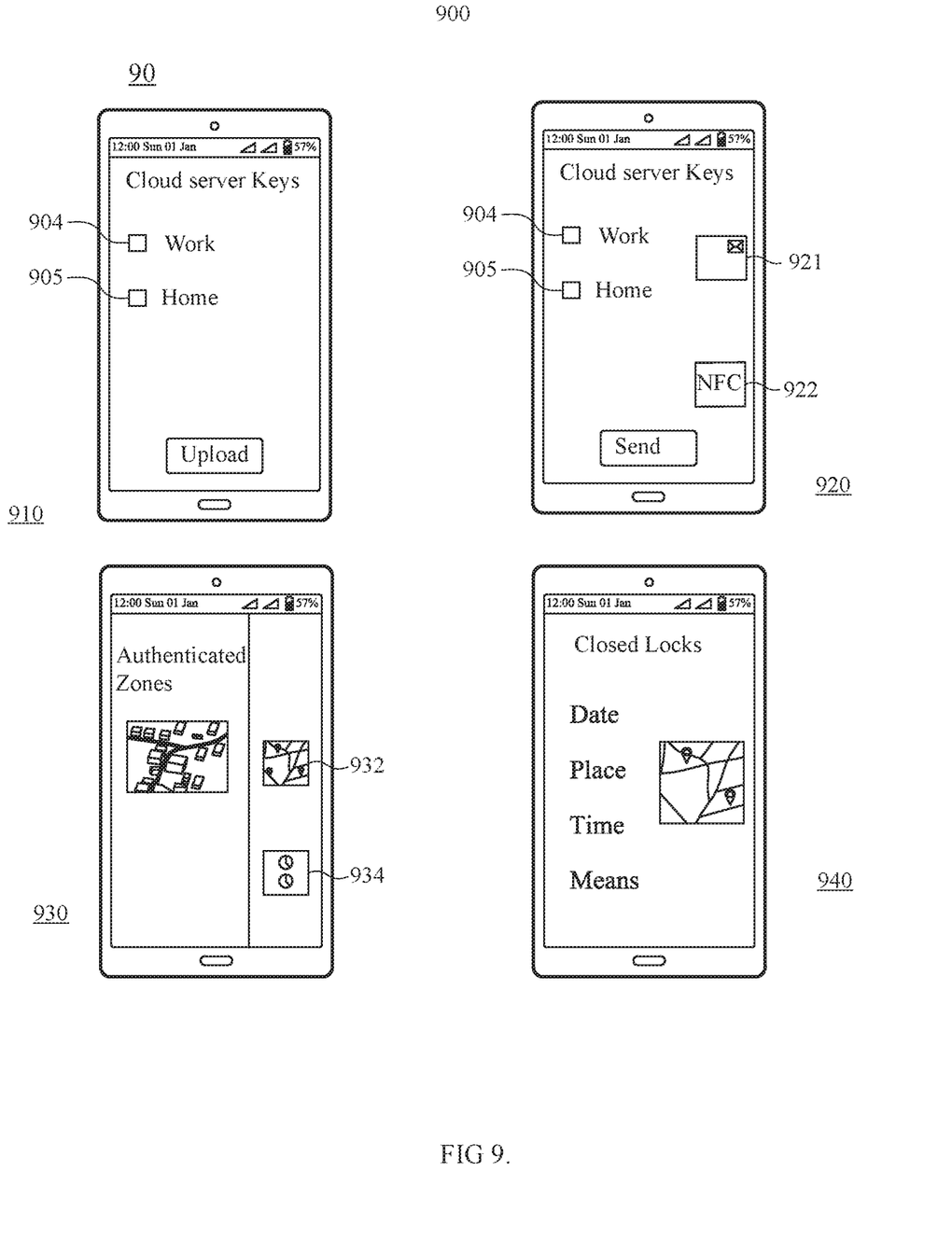
FIG. 9 illustrates an embodiment 90 of a user interface showing a mobile digital locking application when the user is further away from the lock, according to one embodiment described herein.

FIG. 9 illustrates an embodiment 90 of a user interface showing a mobile digital locking application 900 when the user is slightly further away from the lock, in accordance with one or more embodiments of the invention.

The mobile digital locking application 900 typically uses a short-range wireless communication connection that may be any of the following: Bluetooth, NFC, Wi-Fi, infrared, microwave and/or laser connection. In some embodiments the mobile digital locking application may also communicate via cellular data, such as 4G/5G with the lock and/or the cloud server.

In screenshot 910 the mobile station app 900 stores multiple keys and keeps security copies of the keys on the cloud account of the user on at least one cloud server. For example, the user may have digital keys that are used at Home 905 or at Work 904 stored in the system.

In screenshot 920 the user may send the digital key 904, 905 or a copy of the digital key to another person 802, 804, 806 via electronic messaging 921, thereby authorizing the opening of the lock 500 to this person. Typically, the electronic message is sent via the cellular communication network or via a short-range wireless communication connection.

In screenshot 930 the mobile station app 900 is configured to determine the location 932 of the mobile station 800, 802, 804, 806 and store the screen lock authentication at the stored location, and inside a pre-defined distance of the stored location permit multiple lock openings and closures from the same or multiple different locks without requesting the screen lock authentication. The digital keys typically have validity periods which may be configured from the mobile station application 934.

In screenshot 940 after a pre-defined time the lock is automatically locked, preferably by using the electric power received from the mobile station during the opening procedure and/or touch. The closed and opened locks, their locations and times when the locks were closed or opened may be stored into an electronic log, which may be stored on the mobile station 800, 802, 804, 806 and/or on the cloud server 810.

Any features of embodiment 90 may be readily combined or permuted with any of the other embodiments 10, 20, 30, 40, 50, 60, 70 and/or 80 in accordance with one or more embodiments of the invention.

In some embodiments the mobile cloud app may contain a feature with which the user can erase access related or enabling data, in the event that the user is the victim of theft or extortion or any other unauthorized or illegal pursuit to obtain access to rooms, venues or assets the user has access to. For example, if the phone is dropped, the mobile cloud app may activate the erasing of access related or enabling data. Similarly if the gyroscope or accelerometer readings of the mobile station indicate violence, e.g. the user being overpowered by a robber, mugger, or other aggressive third party, the mobile cloud app may erase all access related data pertaining to locks the user has entry. Access related data, such as digital keys related to the locks the user has access to, can in some embodiments be restored from the cloud after the erasing, for example with a special procedure where the real user is identified to be no longer a victim of a crime by a law enforcement official, notary or the like.

Embodiments of the invention have been explained in the aforementioned and sizeable advantages of one or more embodiments have been demonstrated. Embodiments allow the mobile user to stop using physical keys, and instead use his mobile phone with digital keys stored within a cloud app. Using the mobile cloud app is even more convenient than physical brass or steel keys, because there is no need to insert, turn or wiggle the key. Merely opening the latch is sufficient to open the lock and the door. When the mobile locking cloud application is within communication range of the self-powered lock, the app can submit the digital key automatically by answering any queries or prompts and by automatically submitting the keys to open the lock. The app can also release a power pulse from the mobile station to the lock to power the lock, which tremendously lowers the complexity and cost of the engineering required to install and maintain the locks in buildings or vehicles.

The techniques disclosed herein have been explained above with reference to the aforementioned embodiments. However, it is clear that the disclosure is not only restricted to these embodiments, but comprises all possible embodiments within the spirit and scope of the inventive thought and the following patent claims.

What is claimed is:

1. A digital locking system, comprising:
   a mobile station;
   a mobile station app;
   a cloud server; and
   a self-powered lock configured to lock an object, wherein
   the mobile station app is installed in the mobile station and is configured to be updated and maintained by software updates from the cloud server,
   the mobile station is configured to provide operating power to the lock without a power cord,
   the mobile station app is configured to communicate with the lock via a Near Field Communication (NFC) connection, and
   the mobile station app is configured to:
   authenticate a user of the mobile station when a screen lock for the mobile station is unlocked,
   remember the authentication of the user for the mobile station for a pre-defined time period that is longer than a time it takes for the screen lock to activate, wherein during the pre-defined time period the mobile station app is configured to submit a digital key relating to the user via the NFC connection to the lock, thereby opening the lock, and
   determine a location of the mobile station, store a record correlating the authentication with the location, and, inside a pre-defined distance of the location and based on the record, permit multiple lock operations without requesting the authentication.

2. The system of claim 1, wherein the lock is one of: a door lock for a building or a vehicle, a padlock, or a bicycle lock.

3. The system of claim 1, wherein the operating power of the lock is transmitted to the lock by a wireless power transmission device of the mobile station, wherein the wireless power transmission device may include any of NFC or Qi, and wherein when the lock is powered, the NFC connection is established between the lock and the mobile station.

4. The system of claim 1, wherein the mobile station is configured so that the user may send the digital key or a copy of the digital key to another person via an electronic message, thereby authorizing the opening of the lock to this person.

5. The system of claim 4, wherein the electronic message is sent via a cellular communication network or via a short-range wireless communication connection.

6. The system of claim 1, wherein the pre-defined time period extends to the time after the mobile station screen becomes locked, and wherein the mobile station app is configured to communicate the digital key to the lock without the user having to unlock the mobile station screen by reauthentication.

7. The system of claim 1, wherein the mobile station app is configured to store multiple digital keys and to at least one of: (i) keep security copies of the digital keys on a cloud server account of the user or (ii) generate new digital keys.

8. The system of claim 1, wherein the lock is configured to operate based on at least one of: (i) touching the lock with the mobile station or (ii) bringing the mobile station within operating range of NFC for the lock.

9. The system of claim 1, wherein the mobile station app is configured to use NFC to open the lock without a need for the user to retouch the mobile station to the lock or provide a further approval for opening the lock, beyond accessing the unlocked object.

10. The system of claim 1, wherein the mobile station app is configured to, based on a determination that the mobile station is stationary using at least one of gyroscope or accelerometer values for the mobile station, activate a power transmission device to scan for nearby locks during said pre-defined time period.

11. The system of claim 1, wherein the mobile station app is configured to periodically activate a power transmission device to scan for nearby locks during said pre-defined time period.

12. The system of claim 1, wherein after the pre-defined period the lock is automatically locked using the operating power received from the mobile station.

13. The system of claim 1, wherein the user is authenticated with the mobile station screen lock.

14. The system of claim 13, wherein the mobile station screen lock uses biometric identification.

15. A digital locking mobile station app stored in a non-transient memory medium in a mobile station, having computer-readable program code embodied therewith, the computer-readable program code executable by one or more computer processors to perform an operation, the operation comprising:
   authenticating a user of the mobile station when a screen lock for the mobile station is unlocked;
   remembering the authentication of the user for the mobile station for a pre-defined time period that is longer than the time it takes for the mobile station screen lock to activate;
   submitting, during the pre-defined time period, a digital key relating to the user via a Near Field Communication (NFC) connection to a self-powered lock configured to lock an object, thereby opening the lock;
   determining a location of the mobile station;
   storing a record correlating the authentication with the location; and,
   inside a pre-defined distance of the location and based on the record, permitting multiple lock operations without requesting the authentication, wherein
   the mobile station app is configured to be updated and maintained by software updates from a cloud server,
   the mobile station is configured to provide operating power to the lock without a power cord, and
   the mobile station app is configured to communicate with the lock via the NFC connection.

16. The mobile station app of claim 15, wherein the operating power of the lock is transmitted to the lock by a wireless power transmission device of the mobile station, wherein the wireless power transmission device may include any of NFC or Qi, and wherein when the lock is powered, the NFC connection is established between the lock and the mobile station.

17. The mobile station app of claim 15, wherein the pre-defined time period extends to the time after the mobile station screen becomes locked, and wherein the mobile station app is configured to communicate the digital key to the lock without the user having to unlock the mobile station screen by reauthentication.

18. The mobile station app of claim 15, wherein the lock is configured to operate based on at least one of: (i) touching the lock with the mobile station or (ii) bringing the mobile station within operating range of NFC for the lock.

19. The mobile station app of claim 15, wherein the user is authenticated with the mobile station screen lock.

20. The mobile station app of claim 19, wherein the mobile station screen lock uses biometric identification.

21. A digital locking method, comprising;
updating a mobile station app installed in a mobile station using a cloud server;
providing, from the mobile station, operating power to a self powered lock configured to lock an object without a power cord;
communicating from the mobile station app to the lock via a Near Field Communication (NFC) connection;
authenticating a user of the mobile station, using the mobile station app, when a mobile station screen lock is unlocked;
remembering the authentication of the user for the mobile station for a pre-defined time period that is longer than the time it takes for the mobile station screen lock to activate;
submitting, during the pre-defined time period, a digital key relating to the user via the NFC connection to the lock, thereby opening the lock:
determining a location of the mobile station;
storing a record correlating the authentication with the stored location; and
inside a pre-defined distance of the location and based on the record, permitting multiple lock operations without requesting the authentication.

22. The method of claim 21, wherein the operating power of the lock is transmitted to the lock by a wireless power transmission device of the mobile station, wherein the wireless power transmission device may include any of NFC or Qi, and wherein when the lock is powered, the NFC connection is established between the lock and the mobile station.

23. The method of claim 21, further comprising:
sending the digital key or a copy of the digital key from the mobile station to another person via an electronic message, thereby authorizing the opening of the lock to this person.

24. The method of claim 21, wherein the pre-defined time period extends to the time after the mobile station screen becomes locked, the method further comprising:
communicating the digital key from the mobile station app to the lock without the user having to unlock the mobile station screen by reauthentication.

25. The method of claim 21, wherein the lock is configured to operate based on at least one of: (i) touching the lock with the mobile station or (ii) bringing the mobile station within operating range of NFC for the lock.

26. The method of claim 21, wherein the mobile station app, based on a determination that the mobile station is stationary using at least one of gyroscope or accelerometer values for the mobile station, activates a power transmission device to scan for nearby locks during said pre-defined time period.

27. A digital locking system, comprising:
a mobile station;
a mobile station app; and
a self-powered lock configured to lock a door, wherein
the mobile station is configured to provide operating power to the lock,
the mobile station app is configured to communicate with the lock via a Near Field Communication (NFC) connection, and
the mobile station app is configured to:
authenticate a user of the mobile station when the screen lock for the mobile station is unlocked,
remember the authentication of the user for the mobile station for a pre-defined time period that is longer than a time it takes for the screen lock to activate, wherein during the pre-defined time period the mobile station app is configured to submit a digital key relating to the user via the NFC connection to the lock, thereby opening the lock, and
determine a location of the mobile station, store a record correlating the authentication with the location, and, inside a pre-defined distance of the location and based on the record, permit multiple lock operations without requesting the authentication.

* * * * *